No. 868,786. PATENTED OCT. 22, 1907.
R. JOHNSON.
DRIVING APPLIANCE FOR SPEED METERS.
APPLICATION FILED NOV. 9, 1906.
2 SHEETS—SHEET 1.
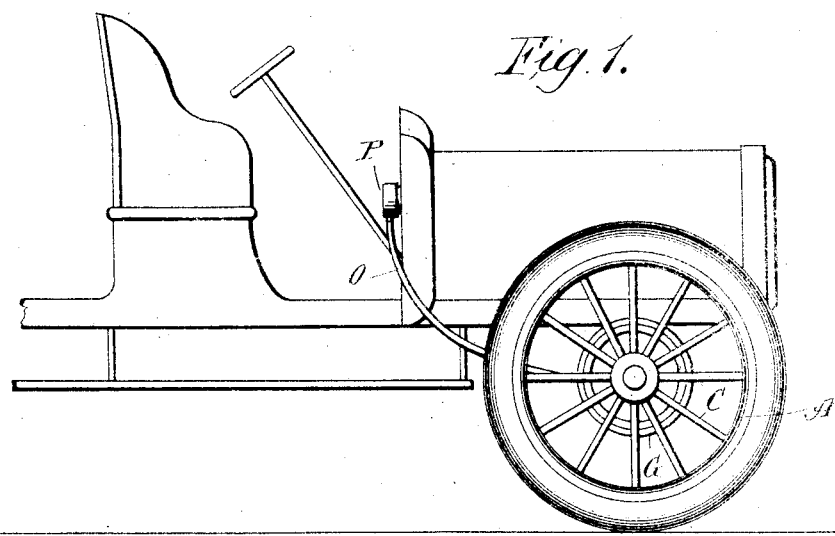
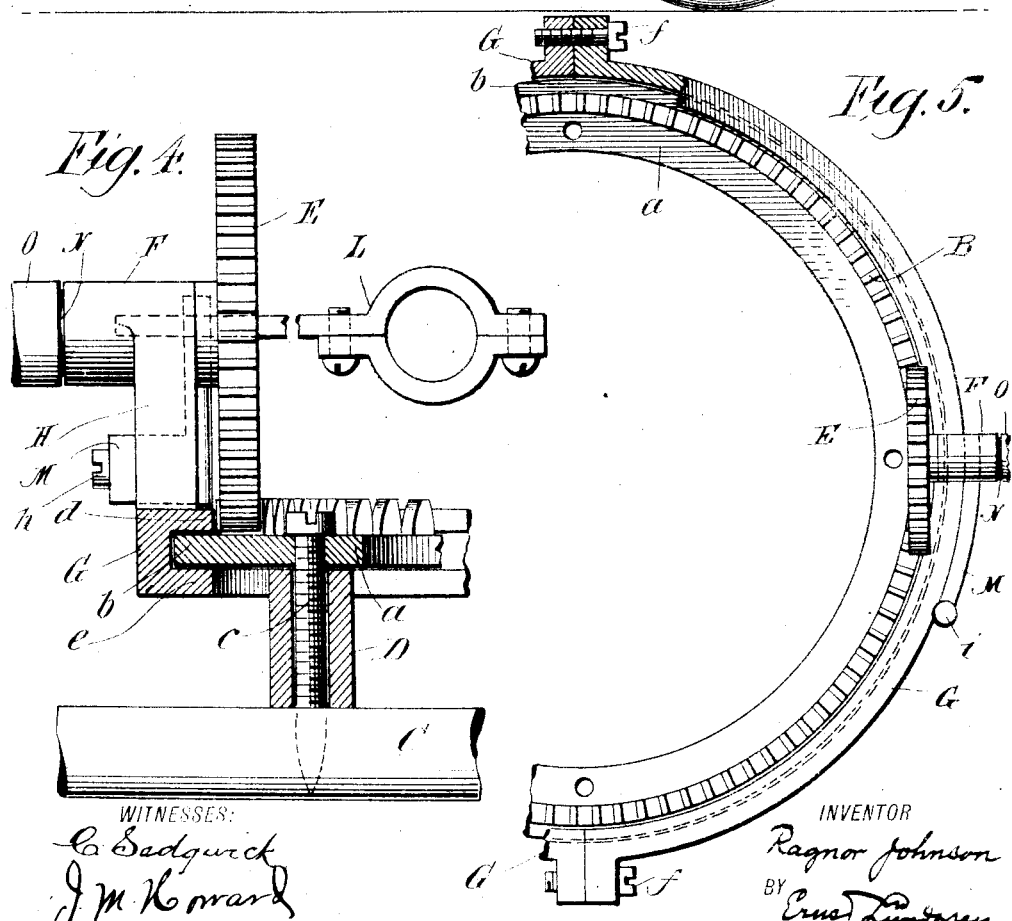
WITNESSES:
INVENTOR
Ragnor Johnson
BY Ernst Lundgren
ATTORNEY No. 868,786. PATENTED OCT. 22, 1907.
R. JOHNSON.
DRIVING APPLIANCE FOR SPEED METERS.
APPLICATION FILED NOV. 9, 1906.
2 SHEETS—SHEET 2.
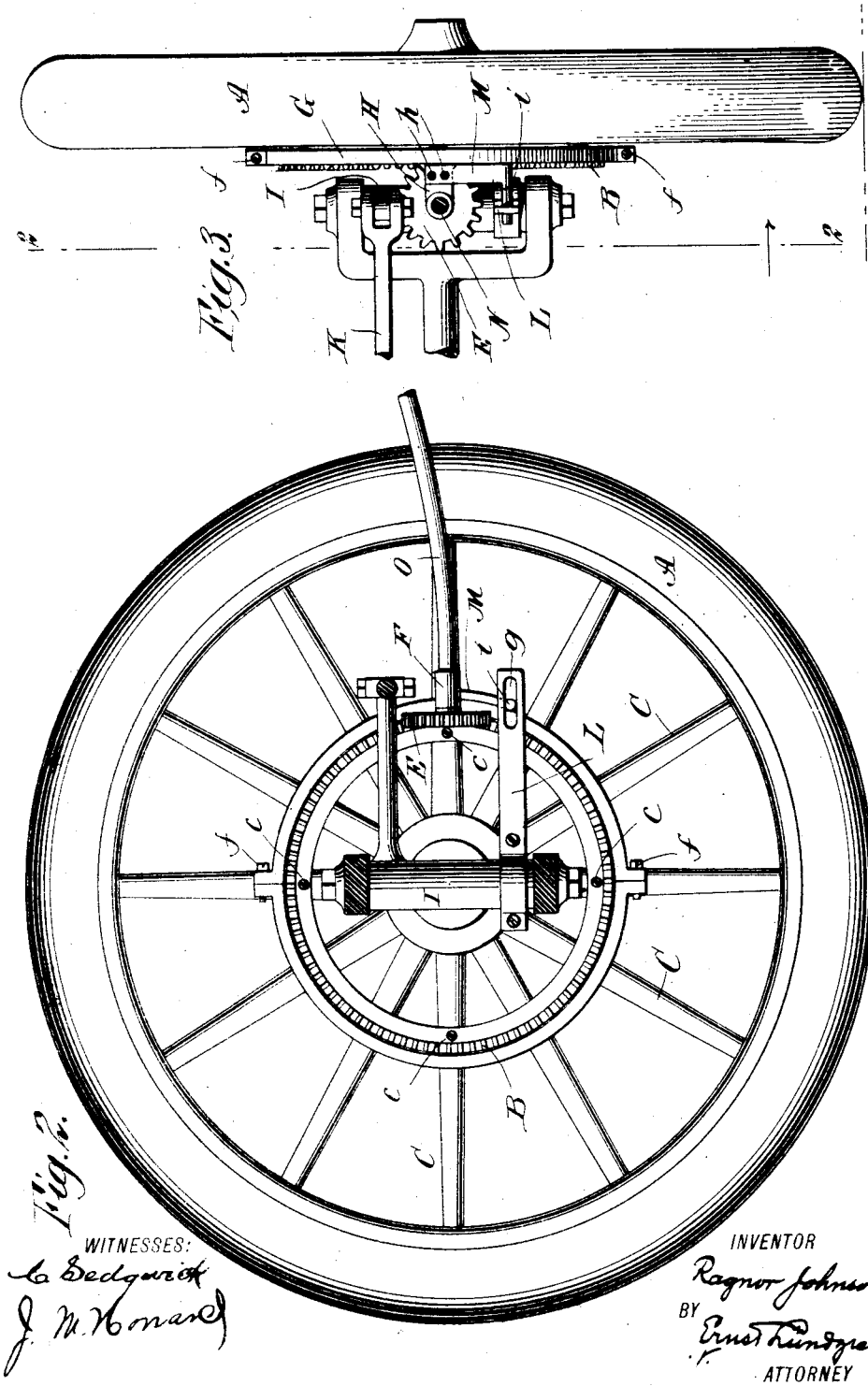
WITNESSES:
INVENTOR
Ragnor Johnson
BY
Ernst Lundgren
ATTORNEY

UNITED STATES PATENT OFFICE.

RAGNOR JOHNSON, OF WORCESTER, MASSACHUSETTS.

DRIVING APPLIANCE FOR SPEED-METERS.

No. 868,786.

Specification of Letters Patent.

Patented Oct. 22, 1907.

Application filed November 9, 1906. Serial No. 342,751.

*To all whom it may concern:*

Be it known that I, RAGNOR JOHNSON, a subject of the King of Sweden, residing at Worcester, in the county of Worcester and State of Massachusetts, have invented certain new and useful Improvements in Driving Appliances for Speed-Meters, of which the following is a full, clear, and exact specification, reference being had to the accompanying drawings and to the reference characters marked thereon.

My invention has relation to means for connecting a speed meter with a revolving wheel, as the wheel of a vehicle, so that the revolution of the wheel will cause the operation of the speed meter, which meter indicates the speed of the vehicle or the rapidity of revolution of the wheel.

The object of my invention is to provide or produce a simple, cheap, effective and reliable means for connecting a wheel, especially a wheel of a vehicle, with a speed meter for the purpose of driving the latter.

To accomplish the foregoing object and to secure other and further advantages in the matters of construction, application, operation and use, my improvements involve certain new and useful arrangements or combinations of parts, peculiar features of construction and principles of operation, as will be herein first fully described and then pointed out in the claims.

In the accompanying drawings forming part of this specification,—Figure 1 is a side view of a portion of a vehicle, as an automobile, showing the general arrangement of a speed meter and its connection with one of the forward wheels of the vehicle. Fig. 2 is a view in elevation showing the vehicle wheel with my improved appliance mounted in connection therewith, the view being taken on a plane through line 2—2 of Fig. 3, and looking in the direction of the contiguous arrow. Fig. 3 is a front elevation corresponding with Fig. 2. Fig. 4 is a sectional elevation of a fragment showing the operating parts on a larger scale than in previous figures. Fig. 5 is a plan view, partly in horizontal section, showing a fragment of the crown wheel and the pinion in position in connection therewith.

In all these figures like reference characters are employed to indicate corresponding parts.

A represents a wheel of any vehicle, particularly of an automobile, and it stands in the place of any other wheel or a shaft, of which it may be desired to indicate the speed of rotation, and, as is usual, through it the speed of translation of the vehicle, if it be applied in connection with a vehicle. The appliance for operating the speed meter derives its motion primarily from the wheel or the shaft on which it is mounted.

In my improved form of driving appliance, B represents a toothed or crown wheel of which the teeth are perpendicular to the plane of the crown. The crown wheel is provided on the inner and outer sides of the row of teeth with flanges, represented at $a$, and $b$; and it is secured to the spokes, C, at suitable points by appropriate screws, as $c$, which pass through openings provided for them in the inner flange $a$, and enter the spokes, as best represented in Fig. 4. To sustain the crown sufficiently far from the face of the wheel, blocks, as D, of the desired length are interposed between the crown and the spokes, and the screws, $c$, are made to pass through these blocks. The blocks are preferably made of rubber or other suitable material which will afford at least a slight degree of elasticity. Under this construction and arrangement it will be apparent that the crown wheel when mounted in place will move precisely as the vehicle or other wheel, A, moves.

E is a pinion arranged to mesh with the teeth of the crown wheel and to be driven thereby. The shaft of this pinion is journaled in a suitable box, F, and maintained always in proper working relation with respect to the crown wheel notwithstanding any movements which may be communicated to the latter.
To effect the support of the journal box and maintain the desired constant working relation between the crown wheel and the pinion, the crown wheel is surrounded by a band, G, the same having a groove or channel formed between projecting portions $d$, and $e$, into which groove or channel the flange, $b$, is fitted so as to ride easily and smoothly. For convenience of application the band G is made in two sections, as indicated, and these sections are coupled by coupling bolts, as $f$, which pass through suitable lugs on the two sections. By this construction the band is easily applied in connection with the crown wheel, after the latter has been secured in position for use.

An arm, H, unites the band G with the journal box F, and these parts may well be formed in one piece, although this is not necessary so long as they are rigidly or immovably connected. Thus it will be seen that the journal box, and therefore the pinion, is maintained at the proper distance from the band and consequently at the proper distance from the teeth of the crown wheel which moves within the band. The band is to be held immovable or prevented from circular movement around the crown wheel, and for this purpose it is connected with some part of the vehicle or machine which does not turn.

I represents the vertical element or axle of an ordinary form of knuckle in connection with which the forward wheel of an automobile is usually mounted and which is operated, for steering purposes, by a rod, as K. The knuckle axle I affords a convenient part with which to couple the outer band G. A split yoke, L, is rigidly secured around the axle I and clamped thereon at the desired point by suitable clamping screws, as will be readily seen and understood. The projecting arm of this yoke is slotted as at $g$. Coupled with the arm H is a bracket, M, secured in place as by screw-bolts, as $h$, and this arm is supplied with a projection, $i$, which enters the slot $g$. The arrangement is such, as will be perceived, that the yoke L serves to prevent the band from turning and yet the projection $i$, and the slot $g$, permit all the usual jolting and other disturbing movements without interfering with the proper maintenance of the band, and therefore the crown wheel, in working position.

The shaft N of the pinion projects through the box F, and receives one end of a flexible tube or other flexible connection, O, which reaches to and is joined with the working shaft of the speed meter, P, which latter is sustained at or in the desired location. As the shaft of the pinion is turned so is the shaft of the speed meter.

It will be observed that in the arrangement shown there are no unnecessary angles or corners to be turned or passed by the flexible connection O, it leading directly from the direction of the axis of the pinion shaft and by a gradual bend to the axis of the meter shaft, whereby the movement is made comparatively smooth and without interruptions as are common when the parts are less directly connected. By use of the band encircling the crown wheel, it is rendered impossible for any jolting movements to disturb the relative arrangement of the crown wheel and the pinion no matter to what point the crown wheel may be revolved, and by this means an accurate measure of the actual speed of the wheel or vehicle is insured.

Being constructed and arranged substantially in accordance with the foregoing explanations, the improved driving appliance will be found to admirably answer all the purposes or objects of the invention hereinbefore alluded to.

Having now fully described my invention, what I claim as new herein and desire to secure by Letters Patent, is:

1. In a driving appliance for speed meters, the combination with the toothed crown wheel, of an outer flange applied in connection therewith, an encircling band, an inner flange applied in connection with the crown wheel and perforated, screws passing through said inner flange and into the spokes of the vehicle wheel, and bearing blocks through which the screws pass, said blocks being interposed between the flange of the crown wheel and the spokes, substantially as shown.

2. In a driving appliance for speed meters, the combination with the crown wheel having an outer flange, of a band applied upon said flange, a journal box for the pinion shaft, and an arm for sustaining said journal box rigidly with respect to said band, substantially as and for the purposes set forth.

3. The combination of the crown wheel, the band encircling said wheel, the sustaining arm, and the journal box, the said box, the said arm and a portion of the said band being rigid with respect to each other, for the objects set forth.

4. The combination with the crown wheel and the pinion, of the band encircling the crown wheel, an arm and journal box, a bracket connected with the arm, a yoke slotted as explained, and a projection on the bracket entering the slotted portion of the yoke, substantially as and for the purposes set forth.

5. The herein described driving appliance for speed meters, comprising a crown wheel having outer and inner flanges, means for securing the same in connection with a wheel, an outer band encircling the crown wheel, a journal box sustained upon the band, the pinion, pinion shaft and flexible connection leading to the shaft of a speed meter, a yoke having a slot and a bracket having a projection for entering said slot, the parts being constructed, combined and arranged, substantially as set forth.

In testimony whereof, I have signed my name to this specification in the presence of two subscribing witnesses.

RAGNOR JOHNSON

Witnesses:
C. SEDGWICK,
J. M. HOWARD.